United States Patent Office 2,918,270
Patented Dec. 22, 1959

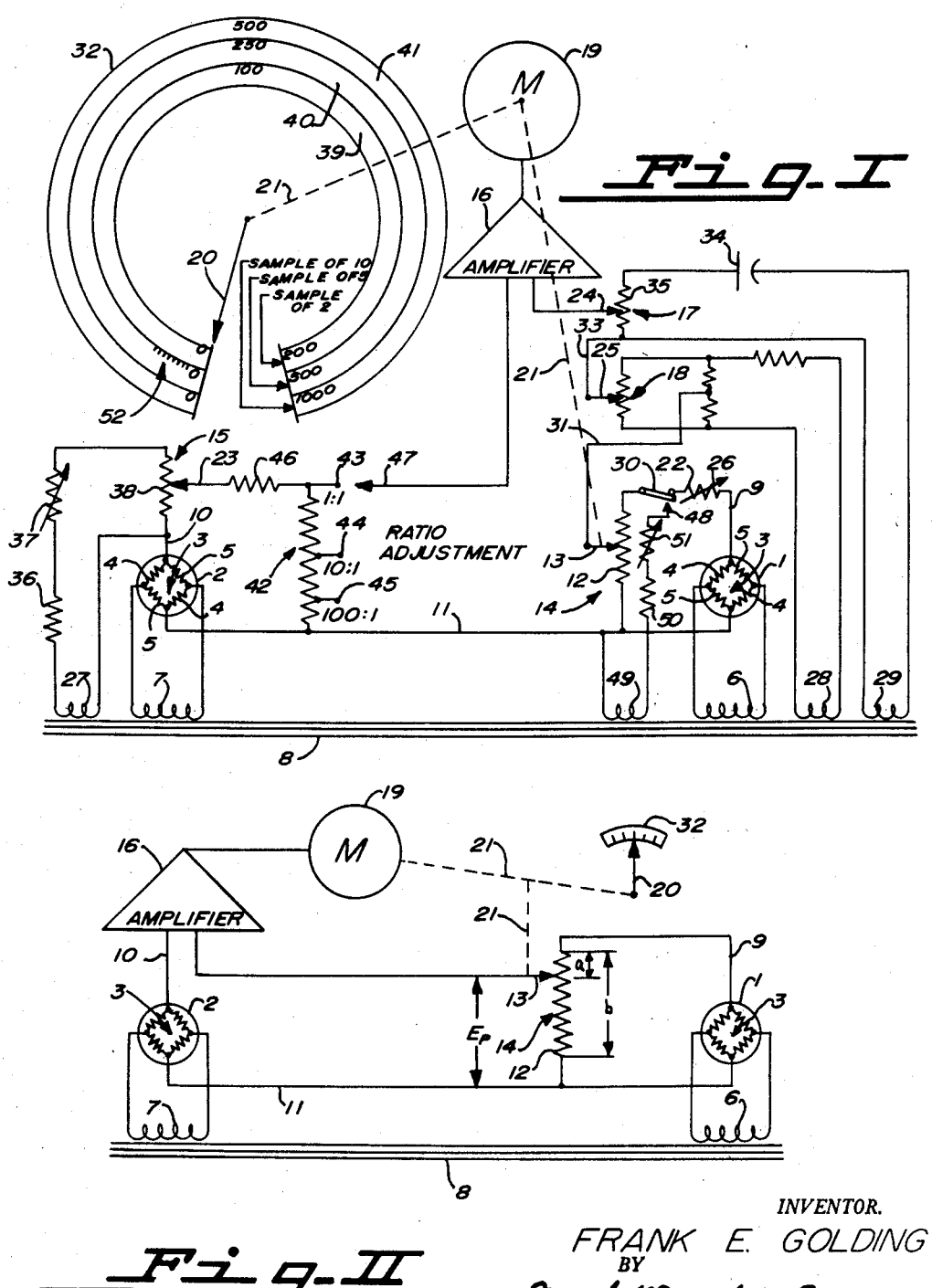

2,918,270
WEIGHING SCALE

Frank E. Golding, Toledo, Ohio, assignor, by mesne assignments, to Toledo Scale Corporation, Toledo, Ohio, a corporation of Ohio Application September 20, 1956, Serial No. 611,078

2 Claims. (Cl. 265—29)

This invention relates to weighing scales and in particular to parts counting scales.

The principal object of this invention is the provision of an electrical parts counting scale.

Another object of the invention is to combine weighing and parts counting functions in a single electrical apparatus.

A further object is to provide, in the electrical parts counting scale, means for selectively increasing the capacity of the scale.

Still another object is to facilitate the accurate adjustment of the electrical parts counting scale.

Other objects and advantages will be apparent from the following description of a preferred form of the invention.

According to the invention, weighing and parts counting functions are combined in a single electrical apparatus which comprises a pair of strain gage load cells or their equivalents, one cell for weighing a known number of sample articles and the other cell for weighing an unknown number of articles. The output voltages of the strain gages, which are functions of loads applied to the respective load cells, cause a servo balance potentiometer slider to be positioned according to the ratio between the output voltages. An indication of such ratio in terms of the number of the previously unknown number of articles is made by an indicator that is automatically positioned according to the position of the potentiometer slider. Alternatively, one of the pair of strain gage load cells may be used for conventional weighing by effecting an unbalance of a balanceable network in accordance with variations in a variable condition, i.e., load upon the load cell, and causing a servo balance potentiometer to operate as a result of such unbalance and return the network to a balanced condition. Provision also is made for means to facilitate accurate adjustment of the apparatus and for means to selectively increase the capacity of the apparatus.

A preferred embodiment of the invention is illustrated in the accompanying drawings. In the drawing:

Figure I is a schematic wiring diagram showing the essential components of the electrical weighing and parts counting scale.

Figure II is a simplified schematic wiring diagram which illustrates the basic operation of the parts counting function of the scale shown in Figure I.

These specific figures and the accompanying description are intended merely to illustrate the invention and not to impose limitations on the claims.

Referring to Figure I, an electrical scale providing both weighing and parts counting operations includes a sample load cell or receiver 1 and a counting load cell or receiver 2 of conventional type. Each of the cells 1 and 2 comprises a resistance wire strain bridge 3 having resistance elements 4 in two of its legs and resistance elements 5 in the other two legs. The bridges 3 are of an ordinary type use in gages available for measuring strain wherein the elements 4 and 5 are adapted to change in resistance with changes in a condition to be measured, e.g., loads applied to the load cells 1 and 2. It is to be appreciated, however, that other forms of electrical translators which produce electrical signals that are functions of the loads applied to the load cells 1 and 2 may be used in place of the strain gage bridges 3. The bridges 3 or other load sensing combinations are energized by separate isolated secondaries 6 and 7 of a power transformer 8. The voltages or output potentials derived from the bridges 3, which voltages are proportional to the weights of loads applied to the respective load cells, are applied to several scale circuits through output leads 9 and 10, the bridges being interconnected through a lead 11.

In order that measurements of loads applied to the load cells 1 and 2 may be obtained, the output leads 9 and 10 are connected through the scale circuits to a constant resistance 12 and to a sliding contact 13, respectively, of a servo balance potentiometer 14 which, when the apparatus is conditioned to be used as a parts counting scale, is excited by the output potential of the sample load cell 1. A tare adjust potentiometer 15, an amplifier and motor control device 16, a quadrature adjust potentiometer 17, and a zero adjust potentiometer 18 are connected in circuit with the output lead 10. The amplifier and motor control device 16 functions to control the operation of a motor 19 which both positions an indicator 20 and the sliding contact 13 of the servo balance potentiometer 14 through a mechanical connection 21. A span adjust variable resistor 22, which functions to adjust the voltage across the potentiometer 14, is connected in circuit with the output lead 9. The potentiometers 15, 17 and 18 and the variable resistor 22 have sliding contacts 23, 24, 25 and 26, respectively, which are adapted to be positioned manually. Separate isolated secondaries 27, 28 and 29 function to energize the potentiometers 15, 18 and 17, respectively.

When the apparatus is conditioned to be used as a parts counting scale, as hereinbefore mentioned, the servo balance potentiometer 14 is excited by the output potential of the sample load cell 1, the output lead 9 of the load cell 1 being connected to the constant resistance 12 of the potentiometer 14 through a switch 30 which is positioned for the parts counting operation as illustrated in Figure I.

The bridges 3 of the load cells 1 and 2 are balanceable networks that are adapted to be unbalanced in response to changes in loads applied to the load cells. The output potential of the load cell 2 opposes the output potential of the servo balance potentiometer 14 which is excited by the output potential of the load cell 1, the potentiometer 14 driven by the motor 19 serving as a continuously automatically adjustable voltage source or alterable signal source. The output potential of the load cell 2 opposes the output voltage or signal from the servo balance potentiometer circuit connected thereto to determine the flow of current through the amplifier and motor control device 16. An unbalance of the output voltages from the load cell 2 and from the potentiometer 14 results in operation of the motor 19 to position the indicator 20 and the contact 13 of the potentiometer 14 until the opposing voltages are equal whereby input voltage to the amplifier 16 is restored to null, i.e., the signal from the potentiometer 14 is altered automatically to a level balancing the output potential of the counting load cell 2.

The sliding contact 13 is connected through a lead 31 to the zero adjust potentiometer 18 of a zero compensation circuit comprising the transformer secondary 28 and a voltage divider thereacross having the sliding contact 25 whose position can be altered. The function of this circuit is to insert a zero compensation voltage which in cooperation with the circuit next to be discussed results in positioning the indicator 20 at zero indication on an indicia bearing chart 32 when no load is upon the scale. This function is realized by altering the position of the sliding contact 25.

The zero compensation circuit is connected through a lead 33 extending from the sliding contact 25 to the quadrature adjust potentiometer 17 of a quadrature signal compensating circuit connected across the secondary 29 of the transformer 8. This circuit comprises a condenser 34 and a tapped resistance 35 of such magnitude with respect to the condenser reactance at the operating frequency that the voltage between the lead 33 and the sliding contact 24 on the resistance 35 is essentially in quadrature with the zero compensation voltage. The magnitude of this superimposed quadrature component is established by appropriate positioning of the sliding contact 24 whereby the quadrature components in the difference voltage are canceled as is well understood in the art.

The output lead 10 from the counting load cell 2 is connected to the tare adjust potentiometer 15 of a circuit comprising the transformer secondary 27 of the transformer 8 and a voltage divider thereacross made up of a fixed resistance 36, a tare calibration variable resistor 37, and a resistance 38 having the sliding contact 23 whose position can be altered. The function of this circuit is to introduce a voltage which has a 180° phase relationship with the load cell output for adjusting the scale indicator 20 to zero indication on the chart 32 even though tare weight, such as a container for an unknown quantity of articles or parts, is upon the load cell 2. This function is realized by altering the position of the sliding contact 23 which is calibrated in pounds.

The basic operation of the parts counting function of the apparatus may be shown in mathematical terms with reference to Figure II as follows:

At null, i.e., when the signal from the servo balance potentiometer 14 balances the output potential of the counting load cell 2 and where
$Es$=voltage output from sample load cell $1 = K_1 m$
$Ex$=voltage output from counting load cell $2 = K_2 Nm$
$m$=known number of articles in load upon sample cell 1
$Nm$=unknown number of articles in load upon counting cell 2
$Ep$=voltage between lead 11 and sliding contact 13
$K_1$ and $K_2$=constants
$a$=displacement of sliding contact 13
$b$=span or travel of sliding contact 13

$$Ep = Ex = K_2 Nm$$

$$\frac{a}{b} = \frac{Ep}{Es}$$

$$a = \frac{bEp}{Es} = \frac{bK_2 Nm}{K_1 m} = \frac{bK_2 N}{K_1}$$

therefore: $a$ is proportional to $N$.

Since the scale indicator 20 is mechanically connected to the sliding contact 13, since $m$ is a known number, and since $a$ is proportional to $N$, the chart 32 may be calibrated to indicate $Nm$, the number of the previously unknown number of articles upon the counting load cell 2. In other words, the sliding contact 13 of the servo balance potentiometer 14 is positioned according to the ratio between the output potentials of the load cells 1 and 2 and the indicator 20 which is coupled to the sliding contact 13 functions to indicate on the calibrated chart 32 such ratio in terms of the number of the previously unknown number of articles upon the counting load cell 2.

In the operation of the parts counting scale, with reference again to Figure I, a convenient sample of parts or articles to be counted is placed upon the sample load cell 1. For example, two, five, or ten parts may be used, depending on the weight of the individual parts. If the sample load cell 1, for example, has a five pounds capacity, the total weight of the sample quantity must not exceed five pounds, but the greatest allowable sample should be used. It is to be appreciated that any convenient sample of parts may be chosen, the numbers two, five and ten being selected at random for the purpose of the present explanation. Since the numbers, two, five and ten have been chosen, the chart 32 is calibrated in three rows 39, 40 and 41, the inner row 39 being used for a sample of two, the middle row 40 being used for a sample of five, and the outer row 41 being used for a sample of ten, as indicated in Figure I. In other words, the chart 32 has a calibrated scale for each possible sample quantity. The operator must use the appropriate calibration. If desired, mechanical means for exposing only one calibrated scale at a time may be provided. The weight of the container for the unknown quantity of parts, which weight must have been determined previously, is set into the system by adjusting the sliding contact 23 of the tare adjust potentiometer 15 which is calibrated in pounds, the container of parts being placed upon the counting load cell 2.

Indicia in the inner row 39 on the chart 32 are read clockwise from 0 to 200, indicia in the middle row 40 are read clockwise from 0 to 500, and indicia in the outer row 41 are read clockwise from 0 to 1000. It is often desirable to expand the capacity of the chart 32 and this is accomplished by exciting a voltage divider 42 which has taps 43, 44 and 45 to give 1 to 1, 10 to 1, and 100 to 1 ratios, respectively. A fixed resistor 46 is connected in series to lower the maximum output potential of the counting load cell 2 to a level slightly below the maximum output of the sample load cell 1. A selector switch 47 connects the desired tap of the voltage divider 42 to the amplifier 16 and functions to selectively reduce the output potential of the counting load cell 2 by a ratio factor to increase the capacity of the scale.

The unknown number of articles or parts in a container upon the counting load cell 2 is determined by multiplying the chart indication by one of the three ratio factors. For example, using a sample of two upon the sample load cell 1 and a ratio of 100 to 1, 20,000 parts in a container upon the counting load cell 2 can be counted by multiplying the chart indication 200 by 100, or using a sample of five upon the sample load cell 1 and a ratio of 10 to 1, 5,000 parts in a container upon the counting load cell 2 can be counted by multiplying the chart indication of 500 by 10, or using a sample of ten upon the sample load cell 1 and a ratio of 1 to 1, 1000 parts in a container upon the counting load cell 2 can be counted by multiplying the chart indication of 1000 by 1.

The apparatus is conditioned to make weight measurements instead of count measurements by switching the sample load cell 1 out of the circuit and by switching a calibrated excitation for the servo balance potentiometer 14 into the circuit. This is accomplished by moving the switch 30 from its position shown in Figure I to connect with a terminal 48 of an alternate means for exciting the potentiometer 14. Such means includes a secondary 49 of the transformer 8 and a fixed resistance 50 and a variable resistor 51 in series therewith. Hence, the switch 30 functions as means for selectively connecting either the alternate means or the sampling load cell 1 to the servo balance potentiometer 14 for exciting the potentiometer 14.

When the apparatus is conditioned to make weight measurements, such measurements are indicated by the indicator 20 which cooperates with a series of weight indicia 52 on the chart 32, the chart 32 being calibrated for conditions which may exist in the system when the tap 43 of the selector switch 47 is connected to the amplifier and motor control device 16. In practice, the weighting scale is calibrated by first altering the zero and quadrature compensation circuits with no load upon the load cell 2 to that condition which balances the amplifier input with the contact 13 near an end of the servo balance potentiometer 14 and the indicator 20 reading zero. A series of standard weights are then applied to the load cell 2 and the contact 26 on the resistor 22 altered so that the span of the scale is correct. Tare weight may be set into the system by adjusting the sliding contact 23 of the tare adjust potentiometer 15 as hereinbefore described in connection with the parts counting function of the apparatus.

In operation, a load is placed upon the load cell 2 which causes the bridge 3 of the load cell 2 to become unbalanced and to develop an output voltage which is a function of the load, i.e., the bridge 3 of the load cell 2 generates a signal proportional to the weight of the load applied to the load cell 2. Such output voltage opposes the output voltage of the servo balance potentiometer 14, the potentiometer 14 driven by the motor 19 serving as a continuously automatically adjustable voltage source, i.e., the potentiometer 14 driven by the motor 19 serves as means for generating a balancing signal. The output voltage of the strain gage bridge 3 opposes the output voltage of the servo balance potentiometer 14 connected thereto to determine the flow of current through the amplifier and motor control device 16. An unbalance of the output voltages results in operation of the motor to position the indicator 20 and the contact 13 of the potentiometer 14 until the opposing voltages are equal, the indicator 20 indicating on the chart 32 the weight of the load upon the load cell 2.

Various modifications may be made in details without departing from the scope of the claims.

Having described the invention, I claim:

1. An electrical parts counting scale comprising, in combination, a pair of load cells, a first one of the load cells functioning to weigh a known number of sample articles and a second one of the load cells functioning to weigh an unknown number of like articles to be counted and each having circuit means generating an output voltage proportional to the loading of the individual load cell, said output voltages opposing each other, servo means responsive to differences between said voltages for adjusting one of the output voltages to a level balancing the other one of the output voltages, the servo means being positioned according to the ratio between said voltages, indicating means coupled to the servo means for indicating the ratio between said voltages in terms of the number of articles upon the second load cell, and means for selectively changing the output voltage of one of the load cells by a ratio factor to change the capacity of the scale, whereby the number of articles upon the second load cell is determined by multiplying the indication by the factor.

2. An electrical parts counting scale comprising, in combination, a pair of load cells, a first one of the load cells functioning to weigh any one of a plurality of known numbers of sample articles and a second one of the load cells functioning to weigh an unknown number of like articles to be counted and each having circuit means generating an output voltage proportional to the loading of the individual load cell, said output voltages opposing each other, servo means responsive to differences between said voltages for adjusting one of the output voltages to a level balancing the other one of the output voltages, the servo means being positioned according to the ratio between said voltages, indicating means coupled to the servo means and having a calibrated scale for each one of said plurality of known numbers of sample articles for indicating the ratio between said voltages in terms of the number of articles upon the second load cell, and means for selectively changing the output voltage of one of the load cells by a ratio factor to change the capacity of the scale, whereby the number of articles upon the second load cell is determined by multiplying the indication by the factor.

References Cited in the file of this patent

UNITED STATES PATENTS

| | | |
|---|---|---|
| 1,790,883 | Thomas | Feb. 3, 1931 |
| 2,766,981 | Lauler et al. | Oct. 16, 1956 |
| 2,767,974 | Ballard et al. | Oct. 23, 1956 |